United States Patent [19]

Harvey

[11] Patent Number: 4,697,272
[45] Date of Patent: Sep. 29, 1987

[54] CORRUGATED REFLECTOR APPARATUS AND METHOD FOR FREE ELECTRON LASERS

[75] Inventor: Robin J. Harvey, Thousand Oaks, Calif.

[73] Assignee: Hughes Aircraft Company, Los Angeles, Calif.

[21] Appl. No.: 861,764

[22] Filed: May 9, 1986

[51] Int. Cl.$^4$ ............................................. H01S 3/08
[52] U.S. Cl. ......................................... 372/99; 372/2; 372/96; 372/108
[58] Field of Search ..................... 372/99, 2, 96, 107, 372/108, 98

[56] References Cited

U.S. PATENT DOCUMENTS 4,367,551 1/1983 Gover ..................................... 372/2
4,438,513 3/1984 Elias ........................................ 372/2

OTHER PUBLICATIONS

R. Kowarschik, "Waveguide Resonators with Distributed Bragg Reflectors", *Optica Acta* 1982, vol. 29, No. 4, pp. 455–462.
D. Marcuse, "Hollow Dielectric Waveguide for Distributed Feedback Lasers", *IEEE Journal of Quantum Electronics*, vol. QE 8, pp. 661 to 669, Jul. 1972.
R. O. Miles & R. W. Grow, "Characteristics of a Hollow-Core Distributed Feedback $CO_2$ Laser", *IEEE Journal of Quantum Electronics*, vol. QE 14, pp. 275–282, Apr. 1978.
A. Yariv, et al, "Periodic Structures for Integrated Optics", *IEEE Journal of Quantum Electronics*, vol. QE 13, pp. 233–251, Apr. 1977.
V. L. Bratman, et al, "FEL's with Bragg Reflection Resonators: Cyclotron Autoresonance Masers Versus Ubitrons", *IEEE JQE*, vol. 19, No. 3, Mar. 1983.

*Primary Examiner*—Leon Scott, Jr.
*Attorney, Agent, or Firm*—V. D. Duraiswamy; V. G. Laslo; A. W. Karambelas

[57] ABSTRACT

A blazed corrugated reflector having internal corrugations or vanes, blazed at specified design angles, coherently reflects power at specified wavelengths. The corrugations meet the criteria of effecting retroreflection according to the Bragg conditions for gratings, eliminating higher order modes of reflection, and maximizing retroreflection and minimizing forward scattering according to the blaze condition. Two such reflectors can be configured into a laser resonator by placing them at opposing ends of a matching waveguide. The reflector does not obstruct the passage of an axial electron beam, thereby making it suitable to implement the resonator portion of a free electron laser.

16 Claims, 6 Drawing Figures

CORRUGATED REFLECTOR APPARATUS AND METHOD FOR FREE ELECTRON LASERS

The Government has rights in this invention pursuant to Contract No. N00014-82-C-0220 awarded by the Department of the Navy.

BACKGROUND OF THE INVENTION

1. Field of the Invention

The present invention relates generally to waveguide reflectors and specifically to a reflector for use in the resonating cavity portion of a free electron laser (FEL).

2. Description of Related Art

Two-stage free electron lasers typically utilize magnetic mirrors at the opposite ends of their resonating cavities to reflect the pump field along the optical axis of the cavity. A typical example of a free electron laser (FEL) is illustrated in U.S. Pat. No. 4,438,513 issued in the name of Luis Elias and assigned to the United States of America.

An FEL operated in the microwave to far-infrared bands, however, requires a high-Q resonator through which an electron beam must be passed. Since future FELs must be capable of generating very high average power, the resonators therein will have to be overmoded, i.e., use quasi-optical propagation with cross sections larger than a half wavelength to avoid thermal damage to the resonator structure. The expanding Gaussianmode patterns of a conventional confocal or a concentric resonator, however, do not easily fit within the bore of the wiggler-magnet array, especially at frequencies below 100 GHz. As a result, the radiation fields of such conventional resonators must either be confined by some means along the 30–100 cm interaction length or the resonator must be very large, on the order of 10 meters.

Reflectors utilizing square-wave corrugations operating with the known principle of Bragg scattering relating to constructive interference at certain angles called Bragg angles, have been previously proposed for use in waveguides. See, e.g., "Waveguide Resonators with Distributed Bragg Reflectors" by R. Kowarschik and A. Zimmerman, *Optica Acta* 1982, Vol. 29, No. 4, pages 455–462. According to the prior art literature, however, the shape of the corrugations has little effect on the reflection coefficient. See, e.g., articles by: Marcuse, *IEEE Journal of Quantum Electronics*, Vol. QE8, pages 661–669, July 1972; and Miles and Grow, *IEEE Journal of Quantum Electronics*, Vol. QE14, No. 4, pages 275–282 April 1978; and Yariv, et al., *IEEE Journal of Quantum Electronics*, Vol. QE13, pages 233–251, April 1977.

Couplers using diffraction gratings built directly into a dielectric waveguide for use in input or output coupling from the waveguide modes to free-space, or substrate propagating modes, are discussed by Yariv, et al., *IEEE Journal of Quantum Electronics*, Vol. QE 13, pages 233–251, April 1977 at pp. 249–251. The waveguide grating couplers discussed by Yariv et al. are built not into metallic waveguides but into dielectric waveguides, and their function is to scatter power out of the waveguide rather than coherently reflecting it inside the waveguide. Also, the corrugations are not blazed. The discussion includes an analysis of the coupling loss of such a waveguide grating with sawtooth-type triangular corrugations.

Bratman et al, in "FELs with Bragg Reflection Resonators Cyclotron Autoresonance Masers Versus Ubitrons", *IEEE Journal of Quantum Electronics*, Vol. QE19, No. 3, pages 282–95, March 1983, discuss the applications of sinusoidal corrugated reflectors in FELs, Ubitrons and Cyclotron Autoresonance Masers (CARM).

The sawtooth type triangular corrugations shown in FIG. 35 of the Yariv article and the sinusoidal corrugations of Bratman et al. are not spaced apart with an intervening base.

It is known in the field of optics, particularly as related to diffraction gratings, that "blazing" of grooves of a grating will cause it to be particularly reflective of light at a certain wavelength. See, e.g., *Fundamentals of Optics*, Jenkins and White, McGraw-Hill, 1957. As defined in the McGraw-Hill Dictionary of Scientific and Technical Terms, 3rd Edition, a "blaze-of-grating technique" is an optics technique whereby ruled grooves of a diffraction grating are given a controlled shape such that they reflect as much as 80% of the incoming light into one particular order for a given wavelength.

The understanding and applicability of blazing techniques, however, have previously been limited to the optics field and no prior attempts have been made to apply such techniques to waveguides or to free electron lasers.

Accordingly, it is the principal object of the present invention to coherently reflect power at specified wavelengths with a blazed corrugated reflector.

It is another object of the present invention to eliminate the use of reflective mirrors in FELs, and allow unobstructed passage of the electron beam.

A further object of the invention is to allow the generation of high power in an FEL.

SUMMARY OF THE INVENTION

The present invention in a broad aspect, is a corrugated reflector for coherent reflection of the power in a wave at a specified wavelength, having a hollow cylindrical member with a longitudinal axis, and a plurality of blazed vane means, coaxially disposed internally within this hollow cylindrical member along this axis.

In a preferred embodiment, the blazed vane means are triangularly shaped corrugations configured so as to retroreflect the incident wave according to the Bragg condition for gratings, eliminate higher order modes of reflection of the wave, and maximize retro-reflection and minimize forward scattering according to the blaze condition for gratings. In another embodiment of the invention, two such reflectors can be configured into a laser resonator by placing them at opposing ends of a matching waveguide.

The resulting reflector design is a much more compact and efficient apparatus than the conventional distributed-Bragg reflectors in the prior art.

The present invention also encompasses a novel method for reflecting waves in a corrugated reflector such that the blazing condition is satisfied.

The present invention further encompasses a novel laser resonator cavity apparatus employing two of the blazed corrugated reflectors, as well as an FEL utilizing such a cavity.

Other objects, features, and advantages of the present invention will become apparent from a consideration of the following detailed description from the accompanying drawings.

DETAILED DESCRIPTION OF THE INVENTION

Figure 1:
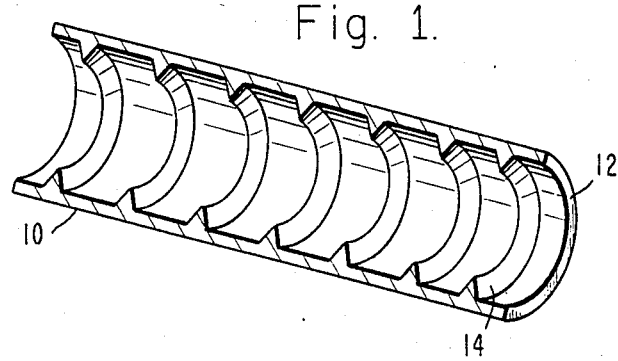
FIG. 1 shows a corrugated reflector according to the present invention.

Referring more particularly to the drawings, a preferred embodiment of a blazed corrugated reflector 10 according to the present invention is shown in FIG. 1. The reflector comprises a hollow cylindrical member 12 utilizing internal corrugations or vanes 14 which are blazed to have specified design angles to coherently reflect power at specified wavelengths.

Figure 5:
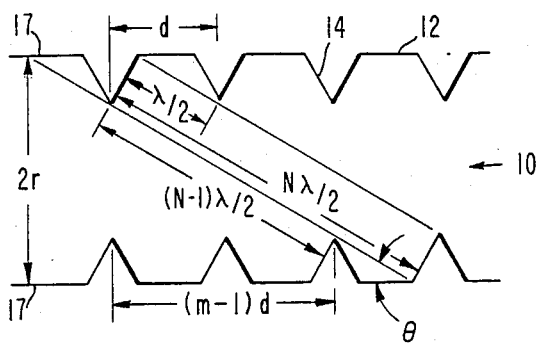
FIG. 5 shows the blaze condition for matching across the reflector of FIG. 1.

In a preferred embodiment, the corrugations are triangular and spaced apart in the transverse direction with intervening bases between them as shown in FIG. 5.

The reflector 10 according to the present invention must meet the following three conditions. First, there must be retroreflection for the Bragg condition for gratings. "Retroreflection" is, as known in the art, reflection wherein the reflected rays of radiation return along paths parallel to those of their corresponding incident rays.

Second, there must be cut-off of higher-angle modes.

Third, there must be blazing to maximize retro-reflection as opposed to forward scattering.

Figure 2:
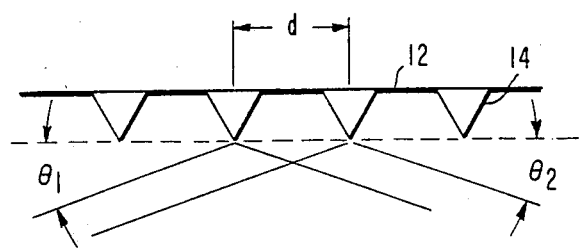
FIG. 2 shows the retroreflective condition for operation of the reflector of FIG. 1.

Turning to the first two criteria, the retroreflective condition of a generalized distributed Bragg reflector is shown in FIG. 2 to which the following equations correspond:

Bragg Condition:

$$d(\cos \theta_1 - \cos \theta_{2,n}) = n\lambda \quad (1)$$

0th Order Forward Scattering corresponding to $n=0$:

$$\theta_{2,0} = \theta_1 \quad (2)$$

1st Order Retroreflection Condition corresponding to $n=1$:

$$\theta_{2,1} = \pi - \theta_1 \quad (3)$$

Equation 3 combined with equation 1 gives:

$$2d\cos \theta_1 = \lambda \quad (4)$$

nth Order at Retroreflection Condition:

$$|\cos \theta_{2,n}| = \frac{\lambda}{2d}(2n-1) \geq \frac{3\lambda}{2d} \quad (5)$$

where:

$\theta_1$ is the incident wave angle;

$\theta_{2,n}$ is the reflected wave angle for the nth order;

n is the scattering order;

$\lambda$ is the free-space wavelength;

d is the spacing between the peaks of adjacent corrugations.

From FIG. 2 and the foregoing equations, it is seen that the forward scattering condition ($n=0$) is always possible. When $\lambda = 2d\cos\theta_1$, however, the first order scattering takes place at an angle such that the wave reverses direction, i.e., retroreflects. If the retroreflection condition is met and $\lambda$ is greater than $(2/3)d$, or $\theta$ is less than 70.5 degrees, then higher-order-scattering angles will be imaginary and no other orders will be possible, thereby satisfying the first two criteria.

Equation (2) indicates that, for the purpose of analysis of the reflector for FEL applications, the angles of the incident and reflected waves are presumed to be equal. Furthermore, Equation (4) indicates that once any two of the quantities $\theta$, $\lambda$, or d are known, the thrid parameter may be determined, and therefore that the design may begin with any one of these three parameters.

When Equations (1)–(5) are applied to analyze the dispersion in an FEL, the following equations result:

Retroreflection Condition:

$$k \cos \theta = \pi/d \quad (6)$$

FEL Dispersion for Waveguide Mode:

$$\Delta\omega = v \cdot \Delta k \quad (7)$$
$$k = \beta(k \cos \theta + k_w) \quad (8)$$
$$= \beta\left(\frac{\pi}{d} + k_w\right) \quad (9)$$

where:

k = wave number of the travelling wave;

$\beta$ = velocity of electrons ÷ speed of light;

$k_w$ = wiggler wave number;

v = velocity of electrons;

d = distance between peaks of adjacent corrugations;

$\theta$ = the angle between the direction of propagation of the wave and the waveguide wall.

Figure 3:
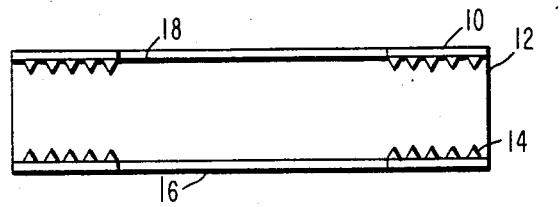
FIG. 3 shows two of the reflectors of FIG. 1 configured as a resonator.

From these equations, it is seen that to achieve the first two criteria, the peaks of adjacent corrugations 14 are spaced at a distance d equal to the longitudinal half-wavelength of the mode to be reflected. The waveguide mode is related to the inside radius of the waveguide 18, to which the reflector 10 is attached to form a resonator 16, as shown in FIG. 3. The distance between the opposing bases 17 of the corrugated reflector as shown in FIG. 5 is selected to equal the waveguide diameter 2r, and are aligned as later discussed for ideal matching of the waveguide modes.

Turning now to the third criterion, namely the blazing of the reflectors to maximize retroreflection as opposed to forward scattering, the blaze angle condition for an FEL, from Equations 6 and 9 is:

$$\cos\theta = \frac{\pi}{d\beta}\left(\frac{\pi}{d} + k_w\right)^{-1} = \frac{1}{\beta\left(1 + \frac{k_w d}{\pi}\right)} = \frac{1}{\beta\left(1 + \frac{2d}{\lambda_w}\right)} \quad (10)$$

Alternatively, the blaze angle condition may be stated as:

$$\cos\theta = \sqrt{1 - k_c^2/k^2} \quad (11)$$

where $k_c$ is the cut-off wave number of the waveguide.

Inside the waveguide, the propagation of the standing and travelling wave modes can be analyzed as the progagation of partial waves, each partial wave travelling through the waveguide in a particular direction. These partial waves arrive at a well-defined angle to the surface of the waveguide. Normally, such a partial wave reflects and forms a complement of itself travelling at the same angle, but away from the surface. This well-defined angle is herein referred to as the angle of the partial wavefront.

Figure 4:
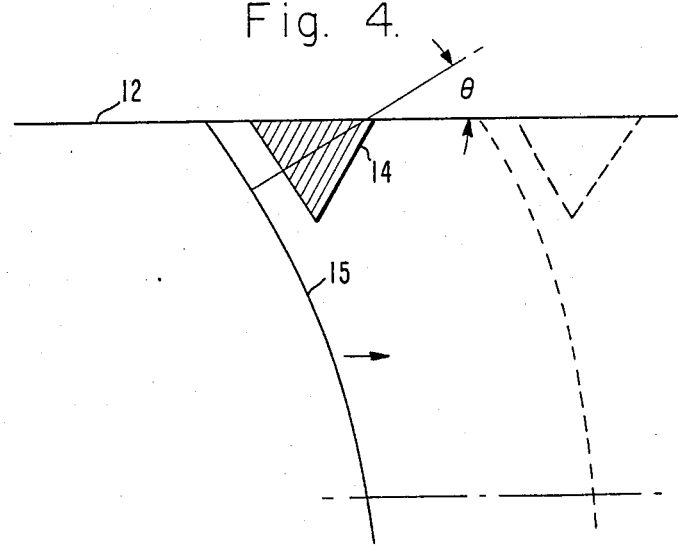
FIG. 4 shows the blaze condition for operation of the reflector of FIG. 1.

FIG. 4 indicates how the blaze condition is met. In order to meet the blaze condition, the corrugations 14 are cut to match the angle $\theta$ given by Equation 11 such that the metal surfaces of the corrugations are parallel to the incident partial wavefront 15. Locally, waves that reflect off a surface add on the curvature of the surface to the existing curvature of the wavefront. If the surface is parallel to the partial wavefront, the wave is returned in the direction from which it came. Between corrugations, the reflected partial wavefront will maintain the original mode shape as long as the surface between the corrugations, namely the intervening base 17 between adjacent reflecting corrugations matches the original mode boundary, i.e., the waveguide wall 18. The bases 17 should be smooth, thereby allowing undistorted propagation of forward scattered partial wavefronts. It is preferred that opposing corrugations are aligned with their peaks in line in a vertical plane tranverse to the longitudinal axis of the hollow cylindrical member, to allow ideal matching of the waveguide modes. In the far field, the partial wavefronts scattered from each of the surface corrugation 14 elements combine and power is consequently scattered predominantly into those grating orders which are aligned with the local scattering angles of the surfaces. Since the retro-reflection condition of Equations 1 through 5 have been met, the scattered power is predominantly reflected into an identical mode travelling in the reverse direction.

A design technique for a cylindrical corrugated reflector based on the foregoing parameters could be as follows:

1. choose the wave frequency, which then provides $\lambda$;
2. choose the waveguide radius or diameter, which then determines the inner diameter of the cylinder 12;
3. $k_c$ will be determined from the diameter of the waveguide;
4. k will be determined from $\lambda$;
5. $\theta$ is then determined from Equation (11);
6. d is then determined from Equation (4); alternatively, d could be determined from the longitudinal half-wavelength of the mode being reflected.

Determination of the parameters d and $\theta$ using the foregoing technique, provides a design technique for a corrugated reflector which will coherently reflect power at wavelength $\lambda$. In a waveguide resonator prototype of the invention configured with two reflectors 10 the reflectivity has been measured to reach as high as 0.99 with as few corrugations as twelve, each reflector constituting an actual percent of 20% of the open area of the waveguide.

When two reflectors 10 are configured as a resonator 16 at opposite ends of a waveguide 18, as shown in FIG. 3, the resulting resonator 16 is a cylindrical high-Q device which does not obstruct the passage of an axial electron beam, thereby making it suitable for using in an FEL. In a prototype resonator, the Q was measured at over 10,000 at 30 GHz while maintaining phase coherence of at least the TE$_{11}$ mode.

From prior analyses of reflectivity of unblazed symmetrical triangular and sinusoidal corrugations, the preferred embodiment of the instant invention would have been expected to result in lower reflectivity because the reflecting sides of the adjacent triangular corrugations are separated by intervening bases and therefore offer shorter sloping reflecting surfaces for a given d, than would be the case if the sides of adjacent corrugations were allowed to extend and contact each other without an intervening base. This is distinguished from the Yariv article. However, as previously discussed, the instant reflector design is both compact and efficient, and the experimental results, discussed above indicate that the preferred reflector configuration of the present invention actually results in higher reflectivity at specific wavelengths. Moreover, neither Yariv nor Bratman et al. discuss optimization of reflectors for use in waveguides, FELs, klystrons, gyratrons, Ubitron and CARMs using blazing techniques.

In order to optimize the design of the resonator 16, the parameters need to be determined; specifically, the number of corrugations 14 in each reflector 10, as well as the length of the waveguide 18.

Regarding the length of the waveguide 18, it should optimally be an integer number of half wavelengths to keep the reflections from the reflectors 10 in phase. In this manner, the overall length of the resonator 16 will match the resonance created by the reflectors 10.

Regarding the minimum number M of corrugations 14 of each reflector 10 in the resonator 16, that number is determined from the following relationships:

$$M \geq m \quad (12)$$

and $$\frac{(m-1)}{(N-1)} = \cos^2\theta \quad (13)$$

where:
N = the number of half-wavelengths between the corrugations in a reflector measured at the Bragg angle $\theta$;
m = number of corrugations encompassed by the wave in crossing the reflector at an angle $\theta$ as shown in FIG. 5.

The relationship in Equation (13) is based on an additional application of the Bragg condition [dCOS $\theta = \lambda/2$], as shown in FIG. 5, which requires that the number of half-wavelengths which a wave traverses in crossing the reflector 10 at angle $\theta$ be an integer number which incidentally is also related to the minimum number of corrugations 14. The number of corrugations 14 is also dependent on the reflection coefficient of the reflector 10, and satisfying Equation (13) will generally ensure an approximately correct relationship between the reflection coefficient and the number of corrugations; typically the minimum number of corrugations is m.

As indicated in FIG. 5, the radius of the waveguide is given as $$r = (N + 1)\sin\theta \frac{\lambda}{4} \tag{14}$$
$$= (N + 1)\frac{\lambda}{4}\sqrt{1 - \frac{(m-1)}{(N-1)}}$$

According to our previous discussion, r and λ had originally been fixed and θ found through Equation 11. In order to complete optimization of the corrugations, r must actually satisfy both Equations 11 and 14. Ideally, r will take on discrete values given by Equation 14. However, for practical purposes, the shape of corrugation 14 can be allowed to deviate from the ideal blaze angle by several degrees, thereby relaxing the condition imposed by Equation 11 correspondingly.

Figure 6:
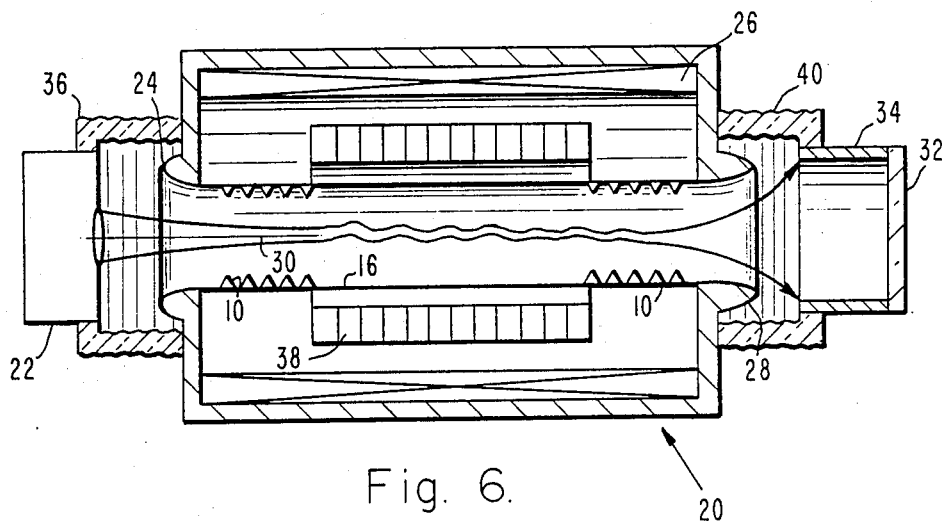
FIG. 6 shows an FEL incorporating reflectors according to the present invention.

An FEL 20 utilizing the advantageous properties of the blazed reflectors 10 just described is shown in FIG. 6. In the FEL 20, the resonator 16 utilizes the corrugated reflectors 10 instead of the conventional metal mirrors. The FEL 20 is comprised of an electron gun 22 producing an electron beam 30, a focusing pole piece 24, a guide field solenoid 26, an out-coupling horn 28, an output window 32, a depressed collector 34, high-voltage bushings 36 and 40, and a magnetic wiggler 38. The configuration and operation of the FEL 20, with the exception of the reflectors 10, is conventional. In a prototype FEL constructed with the corrugated reflectors, 60 kw of output power was produced at 30.75 GHz.

In the foregoing description of the present invention, a preferred embodiment of the invention has been disclosed. It is to be understood that other mechanical and design variations are within the scope of the present invention. Accordingly, the present invention is not limited to the particular arrangement which has been illustrated and described in detail herein.

What is claimed is:

1. A corrugated reflector apparatus for coherent reflection of the power in a wave, comprising;
    a hollow cylindrical member having a longitudinal axis, and
    a plurality of blazed vane means, coaxially disposed internally within said member along said axis, for coherently reflecting power of said wave at a specified wavelength.

2. An apparatus as defined in claim 1, wherein said blazed vane means comprises:
    a plurality of triangularly-shaped corrugations of a configuration whereby retroreflection of said wave occurs according to the Bragg condition for gratings, higher order modes of reflection of said waves are eliminated, and said retroreflection is maximized with said forward scattering of said wave being minimized according to the blaze condition for gratings.

3. An apparatus as defined in claim 2, wherein:
    said corrugations are spaced at the longitudinal half-wavelengths of the mode of said wave to be reflected.

4. An apparatus as defined in claim 2, wherein:
    said corrugations are shaped such that the incident partial wavefront of said wave is parallel to the surface of said corrugations.

5. An apparatus as defined in claim 2 wherein said triangular corrugations of said reflector are spaced apart in the transverse direction such that the distance between opposing bases of said corrugations equals the diameter of said hollow elongated member.

6. A corrugated reflector apparatus for coherent reflection of a certain wavelength of a wave, comprising:
    a hollow elongated member; and
    a plurality of triangularly-shaped corrugations disposed coaxially and internally within said member such that the following two relationships are satisfied:

$$d\cos\theta = \lambda/2, \text{ and}$$

$$\cos\theta = \sqrt{1 - (k_c/k)^2}, \text{ wherein}$$

d is the spacing between peaks of adjacent said corrugation, λ is said wavelengh, θ is the incident wave angle of said wave, k is the wave number of said wave, and $k_c$ is the cut-off number for said wave in a waveguide.

7. A blazed-distributed-Bragg reflector apparatus for coherent reflection of a wave at at least one wavelength, comprising:
    a plurality of vane means for effecting retroreflection of said wave according to the Bragg condition for gratings, for effecting cut-off of higher order modes of reflection, and for maximizing retroreflection and minimizing forward scattering according to the blaze condition for gratings.

8. A method for effecting coherent reflection of a wave at at least one wavelength, comprising:
    directing said wave against a plurality of vane means for effecting retroreflection of said wave according to the Bragg condition for gratings, for effecting cut-off of higher order modes of reflection, and for maximizing retroreflection and minimizing forward scattering according to the blaze condition for gratings.

9. A method for coherently reflecting waves at a specified wavelength, comprising:
    directing said waves into a hollow elongated member having a plurality of triangularly-shaped corrugations disposed coaxially and internally with said member such that the following three relationships are satisfied:

$$r = (N + 1)\frac{\lambda}{4}\sin\theta$$

$$d\cos\theta = \lambda/2, \text{ and}$$

$$\cos\theta = \sqrt{1 - (k_c/k)^2}, \text{ wherein}$$

r is half the distance between the opposing bases of the corrugations, n is an integer, d is the spacing between the peaks of adjacent said corrugation, λ is said wavelength, θ is the incident wave angle of said wave, k is the wave number of said wave, and $k_c$ is the cut-off number for said wave in a waveguide.

10. A laser resonating cavity apparatus comprising:
    elongated waveguide means; and
    a pair of corrugated reflectors disposed at opposing ends of said waveguide means, said reflectors each comprising a plurality of blazed vane means for coherently reflecting power at a specified wavelength.

11. An apparatus as defined in claim 10 wherein:
said reflectors each comprise a hollow tube member; and
said blazed vane means are coaxially disposed internally within said tube member.

12. An apparatus as defined in claim 10 wherein said blazed vane means comprises:
a plurality of triangularly-shaped corrugations of a configuration whereby retroreflection of said wave occurs according to the Bragg condition for gratings, higher order modes of reflection of said waves are eliminated, and said retroreflection is maximized with said forward scattering of said wave being minimized according to the blaze conditions for gratings.

13. An apparatus as defined in claim 12 wherein:
the number M of said corrugations satisfies the relation:

$$M \geq m,$$

and $$\frac{m-1}{N-1} = \cos^2 \theta, \text{ wherein}$$

N is the number of half-wavelengths between said corrugations measured at an angle $\theta$; is the angle of incidence of said wave upon said waveguide wall, and m is the number of said corrugations encompassed by the wave in crossing the reflector at an angle $\theta$.

14. An apparatus as defined in claim 10 wherein:
said reflectors each comprise a hollow and elongated tube member; and
said blazed vane means comprises a plurality of triangularly-shaped corrugations disposed coaxially and internally within said member such that the following three relationships are satisfied:

$$r = (N + 1)\frac{\lambda}{4} \sin\theta$$

$$d\cos\theta = \lambda/2, \text{ and}$$

$$\cos\theta = \sqrt{1 - (k_c/k)^2}, \text{ wherein}$$

2r is the distance between the walls of the waveguide, n is an integer, d is the spacing between the peaks of adjacent said corrugations, $\lambda$ is said wavelength, $\theta$ is the incident wave angle of said wave, k is the wave number of said wave, and $k_c$ is the cut-off number for said wave in a waveguide.

15. An apparatus as defined in claim 10 wherein said waveguide means has a length equal to an integer number of half wavelengths of said wavelength to be reflected.

16. A free electron laser apparatus having means for producing an electron beam and laser cavity resonator means for modulating said electron beam to produce intense coherent radiation wherein said laser cavity means comprises:
elongated waveguide means; and
a pair of corrugated reflectors disposed at opposing ends of said waveguide means, said reflectors each comprising a plurality of blazed vane means for coherently reflecting power at a specified wavelength.

* * * * *